US012027286B2

(12) United States Patent
Revillion et al.

(10) Patent No.: US 12,027,286 B2
(45) Date of Patent: Jul. 2, 2024

(54) DEVICE FOR DAMPING VIBRATIONS OF A FLEXIBLE OR MINERAL-INSULATED CABLE INTEGRATED INTO A RECESS, CABLE THUS EQUIPPED AND MANUFACTURING METHOD

(71) Applicant: THERMOCOAX, Athis-Val de Rouvre (FR)

(72) Inventors: Rémi Revillion, Saint-George des Groseillers (FR); Xavier Potiron, Saint-George des Groseillers (FR); Laurent Pichon, Saint-George des Groseillers (FR); Antoine Chouanneau, Saint-George des Groseillers (FR)

(73) Assignee: THERMOCOAX, Caligny (FR)

( * ) Notice: Subject to any disclaimer, the term of this patent is extended or adjusted under 35 U.S.C. 154(b) by 1158 days.

(21) Appl. No.: 16/640,393

(22) PCT Filed: Aug. 31, 2018

(86) PCT No.: PCT/EP2018/073513
§ 371 (c)(1),
(2) Date: Sep. 4, 2020

(87) PCT Pub. No.: WO2019/043181
PCT Pub. Date: Mar. 7, 2019

(65) Prior Publication Data
US 2021/0142928 A1    May 13, 2021

(30) Foreign Application Priority Data
Aug. 31, 2017 (FR) ...................... 1758061

(51) Int. Cl.
*F16F 1/02* (2006.01)
*F16L 3/12* (2006.01)
(Continued)

(52) U.S. Cl.
CPC ............. *H01B 7/189* (2013.01); *F16F 1/025* (2013.01); *F16F 1/028* (2013.01); *F16L 3/1211* (2013.01);
(Continued)

(58) Field of Classification Search
CPC . H01B 7/189; F16F 1/025; F16F 1/028; F16F 3/1211; F16F 2224/0208; F16F 2234/02; F16F 1/02
(Continued)

(56) References Cited

U.S. PATENT DOCUMENTS 4,001,045 A * 1/1977 Smith .................. G01K 1/14
136/231
4,323,727 A * 4/1982 Berg .................. H02G 3/065
277/622
(Continued)

FOREIGN PATENT DOCUMENTS

EP        0 546 786     6/1993
EP        3 184 979     6/2017
(Continued)

OTHER PUBLICATIONS

International Search Report, PCT/EP2018/073512, dated Nov. 2, 2018.
French Search Report, FR 1758061, dated May 18, 2018.

*Primary Examiner* — William H. Mayo, III
(74) *Attorney, Agent, or Firm* — NIXON & VANDERHYE

(57) ABSTRACT

A device for damping vibrations suffered by a cable and intended to be integrated into a recess for the cable that has a larger cross-section than the cross-section of the cable. The device has at least two tips with tubular cross-sections
(Continued)

that are attached to the surface of the cable and a flexible portion connecting the tips together and extending to the interior wall of the recess.

23 Claims, 6 Drawing Sheets

(51) Int. Cl.
  *G01K 7/02* (2021.01)
  *H01B 7/18* (2006.01)
(52) U.S. Cl.
  CPC ........ *G01K 7/02* (2013.01); *F16F 2224/0208* (2013.01); *F16F 2234/00* (2013.01); *F16F 2234/02* (2013.01)
(58) Field of Classification Search
  USPC .................... 174/74 R, 88 R, 102 C, 102 AS
  See application file for complete search history.

(56) References Cited

U.S. PATENT DOCUMENTS

| 7,104,685 | B2* | 9/2006 | Hanzawa | H01C 1/08 |
| | | | | 374/208 |
| 7,931,401 | B2* | 4/2011 | Landis | G01K 1/22 |
| | | | | 374/208 |
| 2011/0094753 | A1* | 4/2011 | Whiddon | E21B 17/06 |
| | | | | 166/207 |
| 2012/0110845 | A1* | 5/2012 | Burns | H01R 4/70 |
| | | | | 29/869 |

FOREIGN PATENT DOCUMENTS

| FR | 2 263 607 | 10/1975 |
| GB | 1 452 681 | 10/1976 |
| JP | S57 92144 | 6/1982 |
| JP | 2009-133819 | 6/2009 |

* cited by examiner

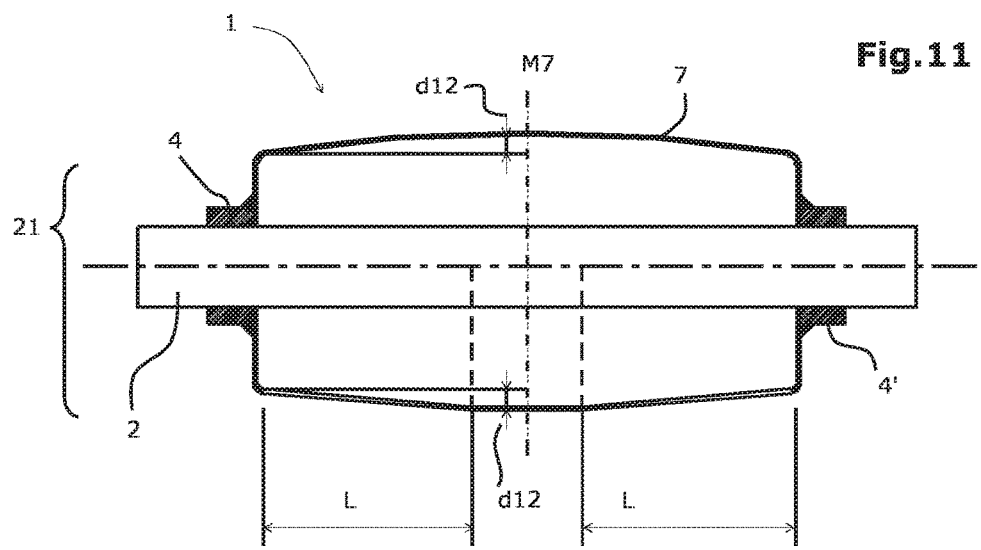
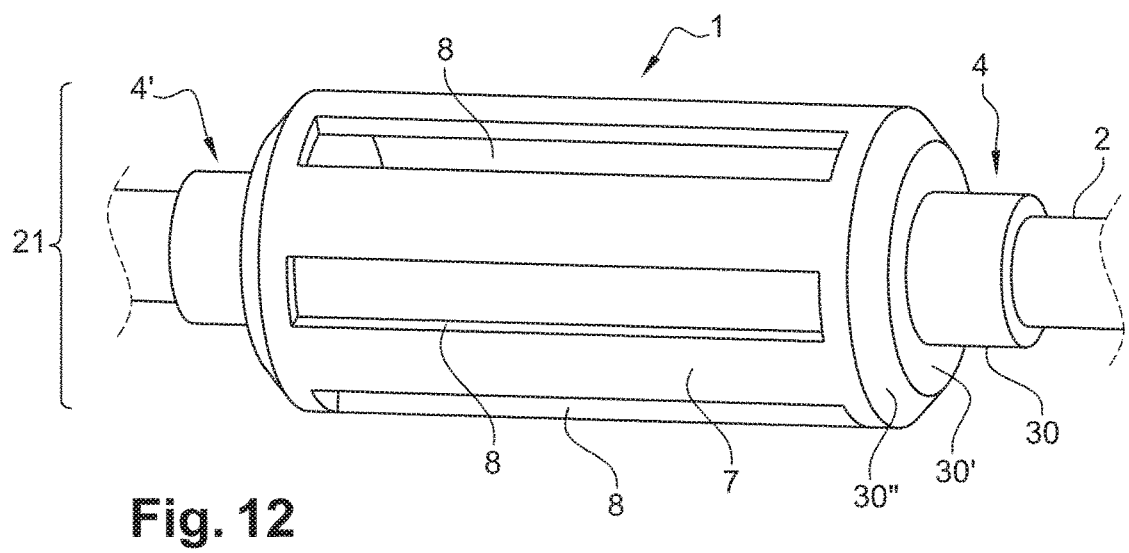

DEVICE FOR DAMPING VIBRATIONS OF A FLEXIBLE OR MINERAL-INSULATED CABLE INTEGRATED INTO A RECESS, CABLE THUS EQUIPPED AND MANUFACTURING METHOD

TECHNICAL FIELD

The present invention relates to a device for damping vibrations, and more precisely to a device for damping vibrations suffered by a mineral-insulated cable or by a flexible cable integrated into a cavity. Additionally, the present invention relates to a mineral-insulated cable or flexible cable including such a vibration damping device, and a method for manufacturing such a flexible or mineral-insulated cable.

STATE OF THE ART

Mineral-insulated cables and flexible cables with particular strength characteristics are used in many technological fields, such as for example in the field of temperature measurement for example using thermocouples, the field of heating applications or even the field of signal transmission cables.

FIG. 1 illustrates a perspective view of a typical circular-shaped mineral-insulated cable 13 which includes a metal conductor 9 surrounded by an insulator 10, in turn surrounded by a metal sheath 11. In other examples, this type of cable includes a plurality of metal conductors, and/or has a rectangular or square shape. A flexible cable, typically an extension cable, can have shapes corresponding to the shapes of the mineral-insulated cable of FIG. 1, for example an armoured cable provided with a flexible external sheath as a metal braid, or a PVC or PTFE sheath.

An important characteristic of the mineral-insulated cable and the flexible cable pertaining to the invention is its ability to withstand vibrations, temperatures and pressures.

A difference between the mineral-insulated cables and flexible cables in question here, is generally the fact that the mineral-insulated cable is constructed with rigid materials and can be used at temperatures between about −200° C. and +2 400° C., whereas the flexible cable is constructed with flexible materials and is used at temperatures between about −60° C. and +450° C.

The choice between these types of cables can also depend on other factors, such as cost, length to be made, radiation sensitivity, and/or the allowed degassing rate.

In the above-mentioned fields, these cables are often integrated into elongated cavities having a greater cross-section than the cross-section of these cables. Current technological developments impose increasingly harsh environments, in particular as regards vibrations suffered by these cables when integrated into these cavities.

For example, thermocouple type sensors, sometimes simply called "thermocouples", are placed in gas turbine exhaust lines for measuring temperatures. These thermocouple sensors can, typically, be based on a mineral-insulated cable technology or a flexible cable technology, at the end of which the part making the thermocouple itself is made. In particular, these thermocouples are inserted and integrated into a cavity of a gas turbine exhaust line, for example a cavity which passes through all or part of the thickness of an exhaust piece.

FIG. 2a illustrates an example in a cross-section view of such a thermocouple type sensor 12 including a connector housing 16 and being mounted on a cable for example of the mineral-insulated type 13 including a positive conductor and a negative conductor. Additionally, the mineral-insulated cable 13 includes a free end 14 for being integrated into a cavity of the gas turbine exhaust and a held end 15 in a part for attaching the thermocouple sensor 12.

In this example, the held end 15 is attached to the connector housing 16 of the thermocouple type sensor 12 in a positioning sleeve 171 being part of an attachment flange 17. This flange 17 includes a hole 18 which is used for attaching the flange of the thermocouple to a piece of the gas turbine exhaust, in which the cavity is provided. Additionally, as illustrated in FIG. 2a, the connector housing 16 encloses two extension wires 20 and 20' respectively connected to the positive conductor and to the negative conductor of the mineral-insulated cable, and which are here embedded in silicone 19. The extension wires are themselves connected to the pins 23 of an electrical connector 161, which opens from the connector housing 16 into the left in FIG. 2a.

When this cable 13 is integrated into a larger cross-section cavity 3, provided for example in the material of a gas turbine exhaust line, the cross-section of the cavity 3 is greater than the cross-section of the cable 13, for example a mineral-insulated one (see FIG. 2b). When the gas turbine operates, the cable 13 suffers significant vibrations resulting in breaks, often located at the junction between the held part 15 and the free part of the cable 13. The cavity 3 is here represented as a blind drill hole, but can also be a through cavity at both ends.

As illustrated in FIG. 2b, in an attempt to overcome this problem, it is known to rigidly attach a rigid tube 22 on a portion of the mineral-insulated cable 13 at a distance A from the part for attaching the thermocouple 12 and at a distance B from the end 14 of the cable 13, such that it locks the cable.

FIG. 2b illustrates a longitudinal cross-section view of the thermocouple 12 of FIG. 2a, with the mineral-insulated cable 13 integrated into the cavity 3 of the gas turbine exhaust 29 and the flange 17 of the thermocouple type sensor 12 when it is attached to the threaded hole of the gas turbine exhaust. For the sake of clarity, the material 29 of the gas turbine exhaust is only partially represented in FIG. 2b.

The rigid tube 22 has an adjusted external diameter very slightly lower than the diameter of the cavity 3 in order to enable the cable 13 to be inserted into the cavity 3. Further, this rigid tube 22 has an internal diameter slightly higher than the diameter of the mineral-insulated cable 13 in order to enable the rigid tube 22 to be inserted into and assembled and to the mineral-insulated cable 13. The attachment of the rigid tube 22 to the mineral-insulated cable 13 is made for example by laser welding.

The rigid tube 22 aims at holding a portion of the mineral-insulated cable 13 in the housing, in order to decrease vibrations suffered by this cable 13.

However, a non held portion (see distances A and B in FIG. 2b) of the cable 13 on which the cable suffers vibrations remains, and breaks still have been noticed.

Moreover, the fact that the rigid tube 22 has an external diameter slightly lower than the diameter of the cavity 3, as mentioned above, results in an poor contact between the rigid tube 22 and the cavity 3. Consequently, vibrations remain, and further leading to constraints and difficulties in inserting the sensor 12 into the cavity 3 and extracting the same.

Thus, it remains interesting to better handle vibrations suffered by a mineral-insulated cable (or by a flexible cable) integrated into a cavity, for example a cavity of a gas turbine exhaust line, by limiting cost requirements as well as the difficulty in integrating these cables into this cavity and extracting the same upon disassembling.

DISCLOSURE OF THE INVENTION

For this, the invention provides a device for damping vibrations suffered by a mineral-insulated cable or by a flexible cable, for being integrated into a cavity having a greater cross-section than the cross-section of the mineral-insulated or flexible cable, the device being characterised in that it comprises:

at least two tips having a tubular cross-section, on at least 30% and preferably 100% of their periphery, with a shape that is adapted for each tip to be integrally assembled to the surface of the mineral-insulated or flexible cable, at least one contact element being a flexible element having an elastic behaviour, preferably of metal, extending from each of said tips and connecting them to each other.

According to the invention, the flexible element is configured such that, when the device is assembled to the surface of the mineral-insulated or flexible cable and the mineral-insulated or flexible cable is integrated into the cavity, the flexible element is abutting on at least one abutment point of the internal wall of the cavity, and typically at least two, providing damping of the vibrations suffered by the mineral-insulated or flexible cable.

Typically, the dimensions of the damping device are chosen such that this abutment is permanent, so as to dampen vibrations on all their amplitude. However, depending on needs, the dimensions of the damping device can be determined such that this abutment only occurs on a part of this amplitude.

Depending on needs, the deformation imposed to the flexible elements by the insertion into the cavity can be chosen higher or lower than their elastic deformation ability. If this deformation remains elastic, the device thereby will not maintain a permanent deformation, and can be reused after disassembling.

According to optional characteristics or particular embodiments of the vibration damping device according to the invention, implemented alone or in combination with each other:

the device includes at least one other contact element, arranged to be assembled to the surface of the mineral-insulated or flexible cable and arranged to contact the internal wall of the cavity at at least one contact point angularly deviated with respect to the abutment point of at least one flexible element by at least 120 ° about the axis of the mineral-insulated or flexible cable; typically but not necessarily, this other contact element is also a flexible element or is carried by a flexible element, for example a rigid element terminating in a flexible part, or vice versa;

the device includes at least one tip attached to the cable, and the flexible element is made by at least one elastic strip (for example of a rounded shape) extending from the at least one tip, and deviating from said tips to abut on a point of the internal wall of the cavity.

the flexible element is made by at least one elastic strip connecting these two tips;

both tubular tips each comprise one end, said ends being connected to each other to form the at least one elastic strip;

both tips and the flexible element(s) are formed as a single two-dimensional piece or metal sheet, having longitudinal cut-offs forming one or more elastic strips between two non cut-off parts, which are shaped to make the tubular tips;

the at least one elastic strip has, in a so-called central part located between both tips, a convex shape deviating from the cable to abut with at least one point of the internal wall of the cavity;

the at least one elastic strip has, in the central part, a longitudinal profile having:
a rounded shape, or
a "Π" or "U"-shape, or
a "Λ" or "V"-shape.

the at least one elastic strip has, in the central part, a linear shape along a direction longitudinal to the cable or oriented within 45 ° from such a longitudinal direction; typically, an abutment of the elastic strip with one or more linear regions of the internal wall of the cavity is thus achieved;

the flexible element includes an elastic tube attached about the tips, the elastic tube having at least one elasticity along a radial direction and being arranged to abut with at least one cylindrical part of the internal wall of the cavity;

the elastic tube has a constant diameter on all or most of its length, or at least of its contact length with the cavity;

the elastic tube has a variable diameter on at least a part of its length, including for example at least one part of its contact length, in particular in a widened shape in the central part or in a frusto-conical shape;

the elastic tube has one or more longitudinal slots, or oriented within 45 ° relative from its longitudinal axis;

the device comprises at least two tips and the flexible element comprises a braid surrounding the cable and connecting these two tips to each other, said braid being determined in thickness or even in density so as to yield an elastic behaviour (at least in compression) and bear both against the external wall of the cable and against the internal wall of the cavity; typically, the braid is made of a metal material, structured and determined to be sufficiently elastic and/or with a sufficient expansion to yield an elastic behaviour between the cable and the wall of the cavity.

Preferably, the flexible element(s) bear against the internal wall of the cavity on a small part of its periphery, for example on a peripheral part the developed view of which does not exceed the developed view of the external periphery of the tip.

According to another aspect, there is also provided a device of the same type but which can include at least one such tubular tip attached to the cable and carrying such an elastic flexible element; wherein the flexible element is made by at least one elastic strip extending from said tip and which has a free end in that it deviates from said tip without being connected to another tip, such that said flexible element abuts on a point of the internal wall of the cavity.

In particular, such a device can include such a flexible element in plurality, which are angularly distributed about the tip and which bear against the internal wall of the cavity on a small part of its periphery, for example on a peripheral part the developed view of which does not exceed the developed view of the external periphery of the tip.

As is understood, the elastic stiffness of the flexible elements in abutment against the cavity provides a resistance to the displacement of the cable inside the cavity, which dampens the amplitude thereof.

The contemplated embodiments enable widely available and inexpensive semi-finished materials and components, for example die-stamped sheet metal or metal braid to be used.

They further enable a contact surface with the cavity which has a contact surface which is small and/or oriented in the displacement direction to be obtained, and the friction of which thus generates a low resistance upon being introduced into the cavity and/or being extracted.

The choice of the nature and thickness of the material, together with the number and/or width of abutting flexible elements, regardless of whether these are separated strips or tube portions located between longitudinal slots or braid portions, enable determined stiffness and abutment force to be obtained to provide an abutment contributing to damping vibrations of the mineral-insulated or flexible cable in the cavity, and preferably by permanently holding this abutment on the entire amplitude of these vibrations.

Additionally, the invention relates to a mineral-insulated cable or a flexible cable including a first so-called free end, for being integrated into a cavity, and a so-called held end which is attached in an attachment part for being attached relative to this cavity, the mineral-insulated or flexible cable being characterised in that it further comprises at least one vibration damping device as set out here, the at least one vibration damping device being attached to a part of the mineral-insulated or flexible cable between the free end and the held end, called a non held part, at a non-zero determined distance from the attachment part.

In some configurations, the end here called a "free" end can further be also attached once it has been integrated into the cavity, for example by being housed at the bottom of the cavity in an part adjusted to its diameter or for example in the case of a through cavity with a second opening, by passing through the cavity from one opening to the other and by receiving a second attachment part at this second opening.

Further, the invention relates to a method for manufacturing a mineral-insulated or flexible cable, for being integrated into a cavity having a greater cross-section than the cross-section of the mineral-insulated or flexible cable, characterised in that it comprises at least the following steps of:

providing a mineral-insulated or flexible cable, including a free end for being integrated into a cavity and a so-called held end which is attached in an attachment part for being attached with respect to this cavity;

providing a damping device as set out here, determined to abut with the internal wall of this cavity; and assembling and attaching this damping device to the external surface of a part of the mineral-insulated or flexible cable located between the free end and the held end, called a non held part, at a non-zero determined distance from the attachment part.

BRIEF DESCRIPTION OF THE FIGURES

The invention will be better understood upon reading the description that follows, only made by way of example, and in reference to the appended drawings in which:

FIG. 3b is a full scale perspective view which illustrates a vibration damping device according to one alternative of FIG. 3a;

FIGS. 5b and 5c are full scale views which illustrate particular alternatives of the embodiment of FIG. 5a:
  in FIG. 5b, with continuously convex, elliptical or olive-shaped flexible elements, yielding an almost tangential contact and a very small friction, and
  in FIG. 5c, with flexible elements having a substantially rectilinear central part, yielding a more elongate contact and a more significant friction;

FIG. 11 is a longitudinal cross-section schematic view which illustrates two alternatives of the damping device of FIG. 10;

FIG. 12 is a full scale perspective view which illustrates an alternative of the embodiments of FIG. 10 or 11;

EXEMPLARY EMBODIMENTS

Figure 1:
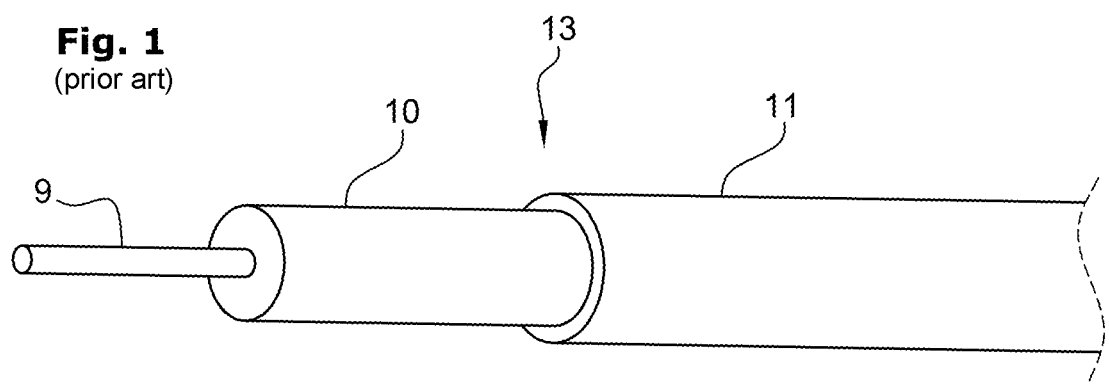
FIG. 1 is a partial exploded perspective view which illustrates a typical mineral-insulated cable, in a single conductor version.

In all the embodiments of a vibration damping device described hereinafter, a flexible cable can be used instead of a mineral-insulated cable and vice versa. The choice of the cable integrated into a cavity is generally made depending on temperatures applied in the technological field in which this cable is used. This can for example be the field of thermocouple temperature measurement, the field of heating applications such as radiation furnace inside heating, or the field of signal transmission cables, or the field of flexible brake hoses. The attachment modes can also vary, depending on the cable nature and external surface and/or depending on the conditions of the environment of use, for example between crimping, welding for example by laser, soldering, or brazing, or other known attachment methods.

For the sake of simplicity, the mineral-insulated cable and flexible cable are hereinafter designated by the term "cable".

The examples shown here pertain to an equipped cable 21, this is the cable 2 itself with its damper 1, integrated into a cavity with a single opening, but the invention is also applicable to a cable integrated into a cavity with several apertures which is a through cavity at each of its ends. In such a case, the part of the cable here called "free end" can also be held in a distal stop, or in another attachment part remote from the first attachment part. Those skilled in the art do understand that such a cable also includes, between these two attachment parts, a non held part that can receive a damping device according to the invention in the same way.

Additionally, depending on the application in which the cable is used, the cavity can correspond to housings of different types. For example, in the application of calculating a turbine temperature, the cavity can correspond to a housing made in a gas turbine exhaust piece.

In all the embodiments of the vibration damping device described hereinafter, the cable is equipped 21 and is integrated into a cavity 3 having a greater transverse cross-section than the transverse cross-section of the cable.

The damping device has a greater external diameter than that of the cavity, and suffers, when being inserted therein, an elastic deformation which abuts it against the walls of this cavity, thus abutting on them to support the cable while damping the vibrations transmitted thereto.

In the embodiments of the vibration damping device shown here, the cable 2 and the cavity 3 both have a circular shape. However, in other embodiments, the cable and/or the cavity have for example a square or a rectangular shape. In any case, the at least one tip of the vibration damping device described hereinafter has a transverse cross-section with an adapted shape to be assembled to the surface of the cable and the flexible element has a determined shape to be integrated into the cavity so as to abut on at least one point of its internal wall.

Additionally, in the embodiments of the vibration damping device shown here, the cable shown is of the mineral-insulated type illustrated in FIG. 1. In this case, the at least one tip of this device is assembled to the surface of the metal sheath 11 of the cable. It is to be noted that, even in the case where the cable is of the flexible type, the at least one tip of this device is assembled to the surface of the external sheath of the cable, which is for example but not necessarily a metal sheath for example as a braided shield.

Figure 3A:
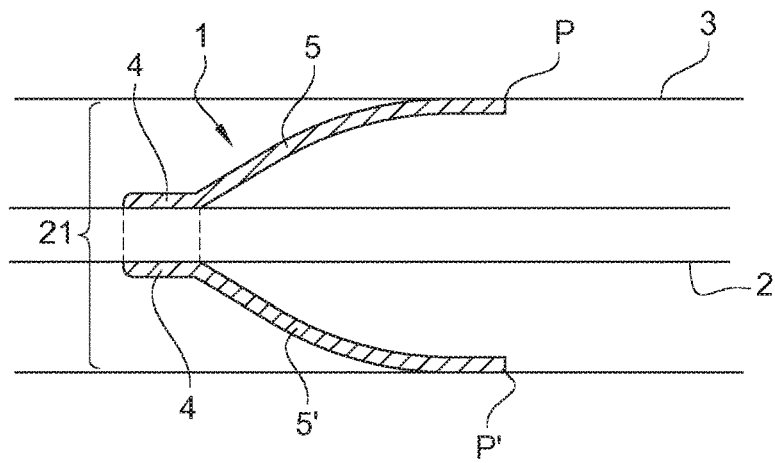
FIG. 3a is a longitudinal cross-section schematic view which illustrates a vibration damping device with a single tip.

FIG. 3a illustrates one embodiment of a vibration damping device 1 according to one exemplary embodiment of the invention. This device 1 includes a single tubular shaped tip 4 assembled, for example by laser welding, to the surface of a circular cable 2 integrated into a circular cavity 3. This tip 4 has an internal diameter slightly higher than the diameter of the cable 2 in order to enable the tip 4 to be inserted into and attached to the surface of the cable 2.

Additionally, this device 1 includes a pair of two rounded shaped elastic strips 5 and 5', angularly spaced by 180° about the axis of the cable 2. These elastic strips 5 and 5' form two contact elements. One end of each of these contact elements is in abutment with a point P and respectively P' of the cavity 3. Thus, both points P and P' are angularly deviated by 180° about the axis of the cable 2. This figure schematically illustrates the presence of two diametrically opposite flexible elements 5 and 5' which are in the section plane, and which will yield a vibration damping in this plane. Depending on needs, the device 1 can also comprise several pairs of such flexible elements, in several longitudinal planes in different angular positions, for examples evenly distributed or not about the cable 2.

As is understood, the elastic stiffness of the flexible elements abutting against the cavity provides a resistance to the displacement of the cable inside the cavity, which dampens the amplitude thereof.

Figure 3B:
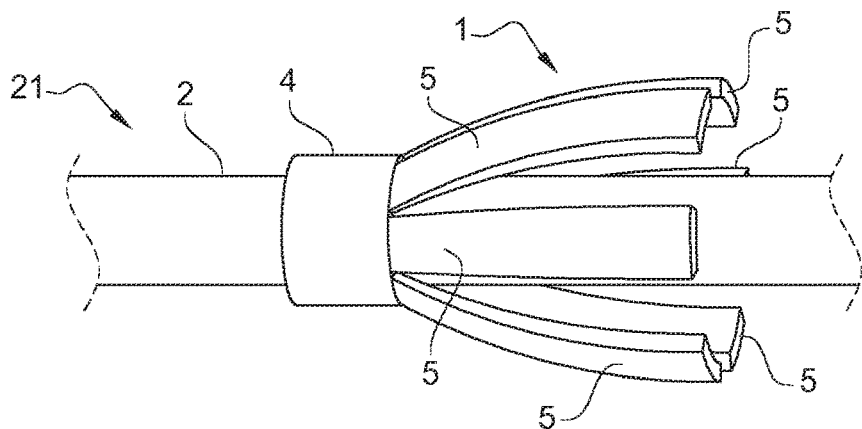

In one alternative illustrated in FIG. 3b, the device 1 includes six rounded shape elastic strips 5 angularly deviated by 60° about the axis of the cable 2. The group of these six elastic strips 5 has an external diameter higher than that of the cavity. Upon integrating into the cavity, these strips 5 abut at six different points of the internal wall of the cavity 3 which are angularly distributed about the axis of the cable 2.

This device 1 is for example made as a single piece, as a planar sheet metal in which parallel linear cut-offs are provided, which are all through cut-offs at only one of their ends, to form the strips 5. The non cut-off part is thereby curved in parallel to the cut-offs to form the tubular tip, and the strips are deviated from the axis of the tip by plastic deformation. The strips 5 are thus made integral directly from the end of the tip 4. Namely, the strips are part of a same piece as the tip, which has been transformed to achieve this shape, and thus they have a continuity in material with the tip.

It will be noted that the embodiments of this type, having only flexible elements attached to the cable at a single one of their ends, for example through a tip, and have thus the advantage of being able to be deformed after being mounted and attached to the cable.

It is thus possible to provide them close to the cable or against it in a first configuration, which enables the equipped cable to be introduced through a small-diameter opening, for example a quick-release coupling. Once the damper device 1 moved to the other side of the quick release coupling is introduced, and before mounting the same, it is thereby possible to deviate the flexible elements such that they can abut against the walls of a greater diameter cavity.

This type of temporary diameter deformation is also contemplated in versions where the flexible elements are attached at two tips by their two ends, but with one of the tips longitudinally movably mounted on the cable.

Figure 4A:
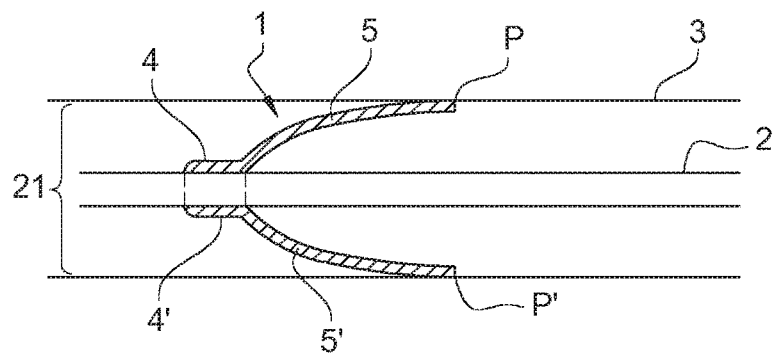
FIG. 4a is a longitudinal cross-section schematic view which illustrates another vibration damping device with a single tip.

FIG. 4a illustrates another embodiment of a vibration damping device 1, which will be only described in its differences. This device 1 includes two semi-tubular or even half-tubular shaped tips 4 and 4', assembled to the surface of the circular cable 2. By way of example, as illustrated in FIG. 4a, the semi-tubular tip 4 is assembled to the surface of the cable 2 at the same longitudinal position and on the other side with respect to the tip 4'. Further, a rounded shaped elastic strip 5 extends from the end of the tip 4 whereas a rounded shape elastic strip 5' extends from the end of the tip 4. The elastic strips 5 and 5' are angularly deviated by 180° about the axis of the cable 2 and its ends are abutting with two respective points P and P' of the cavity 3. Thus, both points P and P' are angularly deviated by 180° about the axis of the cable 2.

The set of the tip 4' and the strip 5' extending from the end of the tip 4' of FIG. 4 is an example of a device including a contact element arranged to be assembled to the surface of the cable 2 and also arranged to contact, and in particular to abut with, the internal wall of the cavity 3 to the point P'.

Figure 4B:
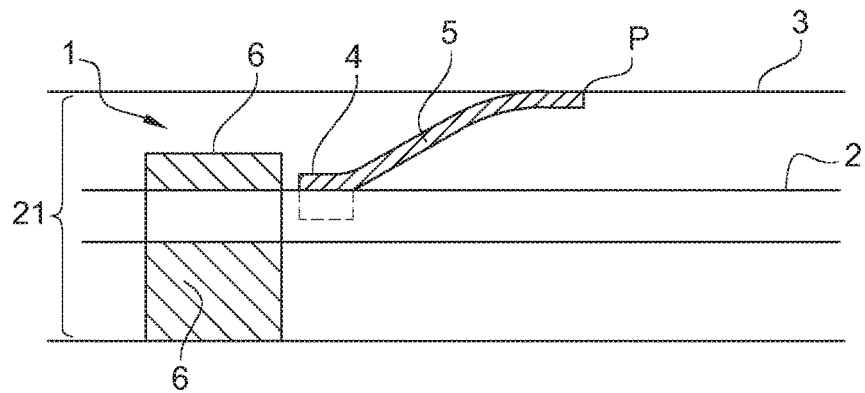
FIG. 4b is a longitudinal cross-section schematic view which illustrates yet another vibration damping device with a single tip.

As illustrated in FIG. 4b, the device can comprise one or more non-flexible contact elements contacting the wall of the cavity on one side of the cable, and which is or are in abutment on the wall because of the action of one or more flexible elements on the other side of the cable.

Thus, FIG. 4b illustrates an example of a contact element which is not flexible. FIG. 4b differs from FIG. 4a in that instead of the set the tip 4' and the strip 5' of FIG. 4a, the damping device comprises a rigid contact element, formed for example by an off-centred rigid tube 6, for example by machining a part of its periphery. The rigid tube 6 is in contact with a part of the internal wall of the cavity 3, for example a cylindrical portion on an angular sector of less than 180 ° and preferably less than 120 °. It has an internal diameter slightly higher than the diameter of the cable 2 in order to enable the rigid tube 6 to be inserted into and attached to the surface of the cable 2. This cylindrical section is angularly deviated relative to the abutment point P of the elastic strip 5 by 180 ° about the axis of the cable 2.

FIGS. 5 to 8 illustrate a family of embodiments, described only in their differences, wherein the damping device 1 includes two tips 4 and 4' attached to the surface of the cable 2, for example of a tubular shape, and where these tips are joined by the flexible element(s) 5, 5'. These different figures illustrate different features which can be combined with each other.

Figure 5A:
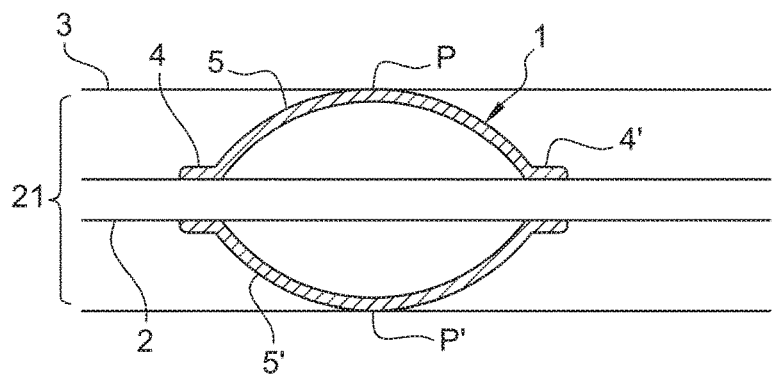
FIG. 5a is a longitudinal cross-section schematic view which illustrates a vibration damping device according to one embodiment of the invention with flexible elements between two tips.

FIG. 5a illustrates a preferred embodiment of a vibration damping device 1, once it is integrated into the cavity 3. This device 1 includes two tubular shaped tips 4 and 4' attached to the surface of the cable 2. These tubular tips 4 and 4' have their facing ends connected to each other to form a pair (or several pairs) of two flexible elements, here elastic strips 5 and 5' having a rounded shape. Both elastic strips 5 and 5' are in abutment through their central part with points P and P' respectively the internal wall of the cavity 3.

Figure 5B:
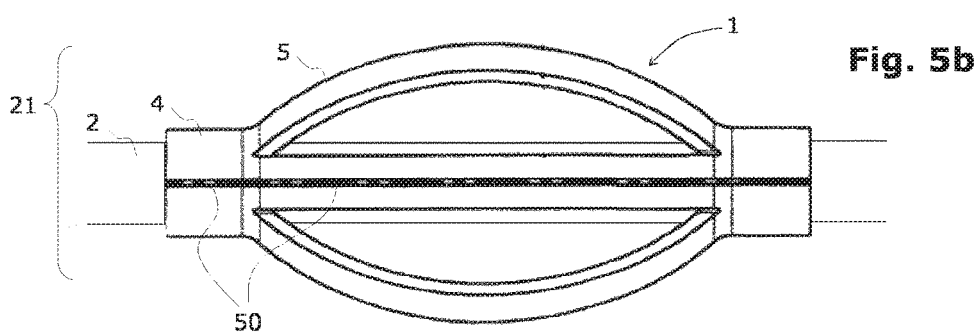
Figure 5C:
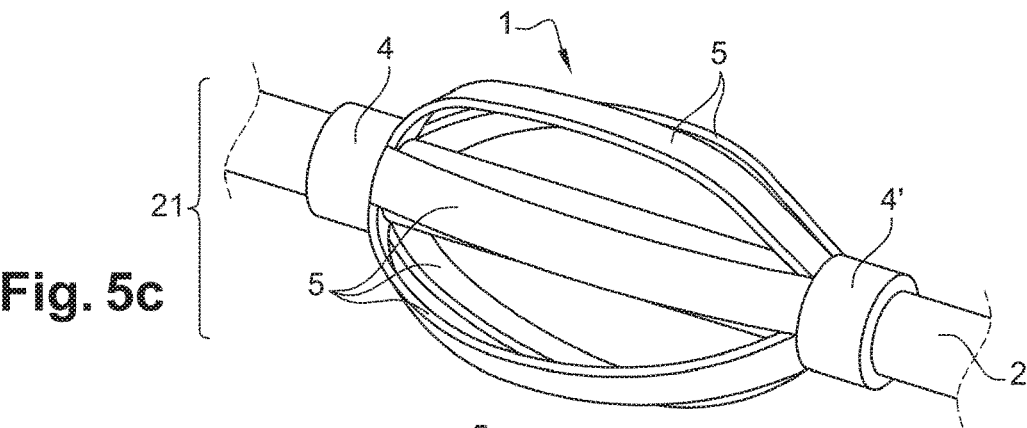

According to preferred alternatives, illustrated in FIGS. 5b and 5c, the device 1 includes six rounded shaped elastic strips 5 angularly deviated by 60 ° about the axis of the cable 2.

In FIG. 5b, the group of these six elastic strips 5 has a rounded, olive or rugby ball-shape, preferably with an external diameter which is slightly higher than that of the cavity. Upon being integrated into the cavity, these six elastic strips 5 abut with six different points of the internal wall of the cavity 3, angularly distributed about the axis of the cable 2.

As long as the cable remains in the cavity, the strips are thus in elastic abutment against the walls of this cavity.

FIG. 5c shows an alternative where the group of these six elastic strips 5 has a rounded shape with a central part (that is between both tips) which is less rounded or even substantially rectilinear, thus yielding a more elongated contact region and a more significant friction.

This device 1 is for example made of a single piece of rolled sheet metal, in the form of a sheet metal in which parallel linear, non-through cut-offs are provided to form the strips 5. At both ends of the strips, both non cut-off parts are thereby curved in parallel to the cut-offs to form both tubular tips. The central parts of the strips are deviated from the axis of the tip by plastic deformation whereas the tips move closer to each other, rather like bellows. The strips 5 are thus made integral from a single piece, directly from one end of a tip 4 to the end facing the other tip 4'. In this example, the rolled sheet metal is closed by welding as a longitudinal weld bead 50, for example by laser welding, preferably TIG or plasma laser.

By way of example, for measuring a gas turbine temperature, for a cavity with a diameter of 6.35 mm receiving a cable with an external diameter of 3.17 mm, such a "bellows" damper can have the following dimensions: inconel sheet metal with thickness 0.5 mm, forming six longitudinal strips each with a width 2 mm, between two tips each having an internal diameter of 3.2 mm and a length of 3 mm, the set having a diameter in the order of 12 mm for a length of 25 mm.

One or more devices can be mounted at different longitudinal positions on a same cable, for example along the length of the non held part of the cable.

Figure 6:
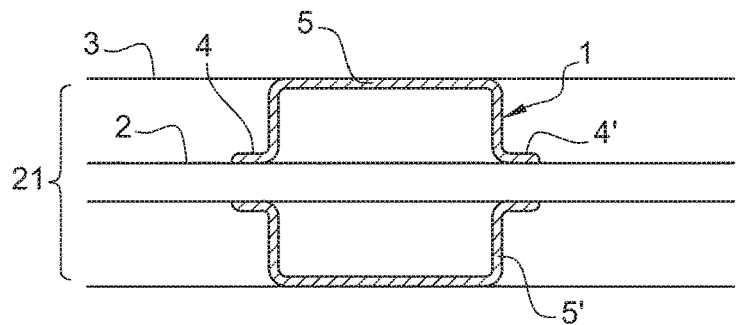
FIG. 6 is a longitudinal cross-section schematic view which illustrates a vibration damping device according to another embodiment of the invention.

An improved lifetime is thus achieved, including under difficult conditions, for example with the following vibration levels for a gas turbine:
  20 to 100 Hz: peak to peak amplitude 0.1524 mm, and
  100-600 Hz: speed 50.8 mm/s FIG. 6 illustrates another embodiment of a vibration damping device 1, only described in its differences. The elastic strips 5 and 5' here have a "Π" (Pi) or "U"-shape, and are each in abutment through their central part on the internal wall of the cavity 3, typically in a linear or cylinder-portion region.

Figure 7:
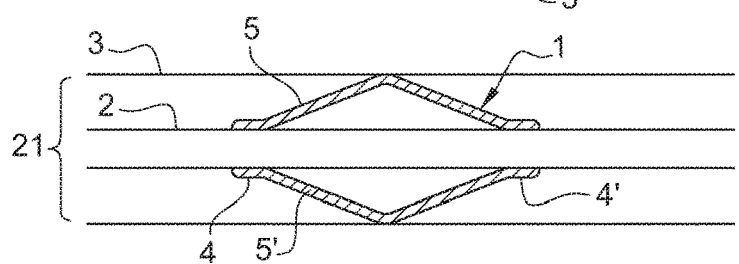
FIG. 7 is a longitudinal cross-section view which illustrates a vibration damping device according to another embodiment of the invention.

FIG. 7 illustrates another embodiment of a vibration damping device 1, only described in its differences. The elastic strips 5 and 5' are here bent to have a "Λ" (Lambda) or "V"-shape, and are each in abutment through their central part with a point of the internal wall of the cavity 3, typically in a point or linear or located region.

Figure 8:
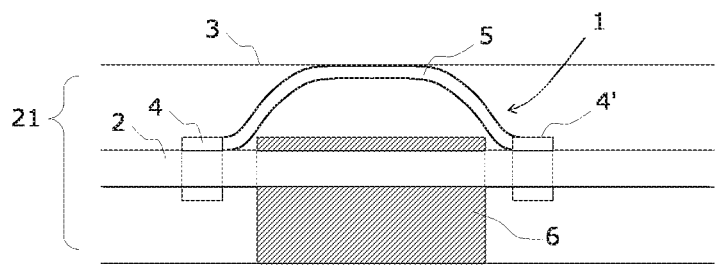
FIG. 8 is a longitudinal cross-section view which illustrates a vibration damping device according to another embodiment of the invention.

FIG. 8 illustrates, in a similar way to FIGS. 5 to 7, an exemplary embodiment with two tips 4 and 4' connected through one or more flexible elements 5, here a single one in the cross-section plane, but in a version also having one (or more) rigid contact element(s) 6.

In the embodiments above, the elastic strips extend from the tip end. One advantage of such a structure is that the manufacture of the device 1 is easy. In particular, this manufacture is made by punching a thin sheet metal, and then is shaped for example by crimping. However, other connections are possible between the flexible elements and the tip(s), the strips can extend from another part of the tip 4, for example from the middle of the tip 4, for example made integral by transforming a same piece or by subsequent attachment.

In other embodiments, the strips 5 and 5' can be in different numbers. Preferably, but not necessarily, these strips 5 and 5' are arranged with respect to each other such that their abutment points P and P' or their abutment surfaces on the internal wall of the cavity are angularly evenly distributed about the axis of the cable 2, whether symmetrically or not.

FIGS. 9 to 12 illustrate another family of embodiments, only described in their differences, wherein the damping device 1 comprises a radially elastic tube 7 which is mounted about the cable by attachment to one or more tips 4 and 4', here one at each end, themselves attached to the surface of the cable 2. These different figures illustrate different features which can be combined with each other.

Figure 9:
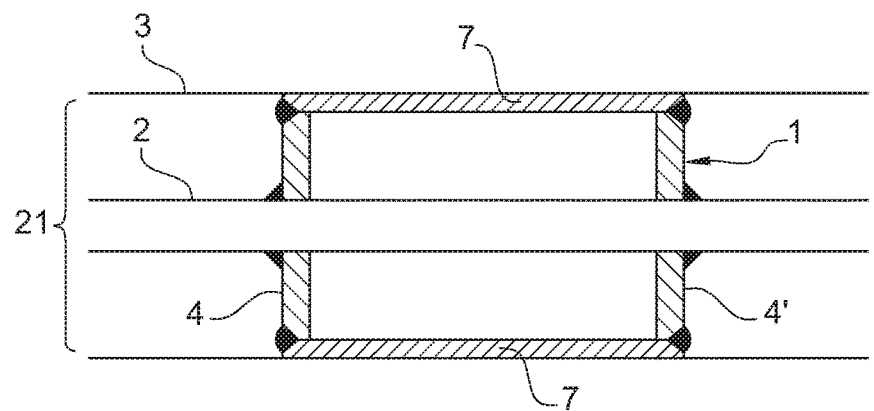
FIG. 9 is a longitudinal cross-section view which illustrates a vibration damping device according to another exemplary embodiment of the invention comprising an elastic tube.
Figure 10:
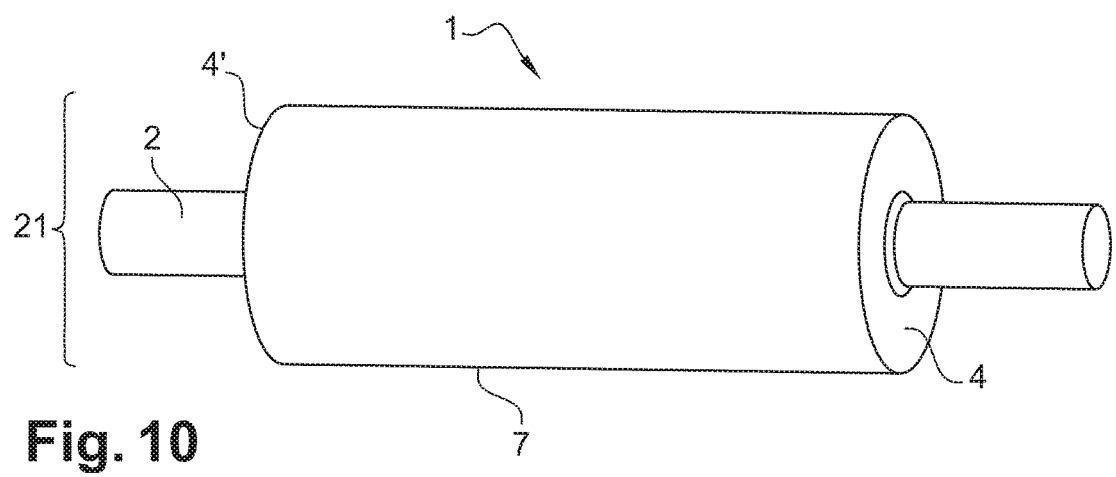
FIG. 10 is a full scale perspective view of the device of FIG. 9.

FIGS. 9 and 10 thus illustrate one embodiment in which the vibration damping device 1 includes two tubular shaped tips 4, 4' attached to the surface of a circular cable 2 for being integrated into a circular cavity 3. The tips 4, 4' have a tubular shape and preferably an adjusted internal diameter slightly higher than the diameter of the cable 2 in order to enable the tip 4 to be inserted into and assembled to the surface of the cable 2. They are for example attached to the metal sheath of the cable by laser welding.

In the example of FIGS. 9 and 10, an elastic tube 7 is attached through both its ends, each about one of the tips 4 and 4'. Alternatively, the tube can also be attached through its ends between both tips. This elastic tube 7 here has a diameter substantially constant on its entire length and abuts on its entire length with a cylindrical section of the internal wall of the cavity 3. It has at each end a transverse wall, made by a tip 4, 4' itself having the shape of a washer, or alternatively a washer attached about a tubular tip. The radial elasticity can be achieved in different ways, for example by a small thickness of the tube, or a radial elasticity of the end walls 4, 4', or of the attachment between both of them, for a combination of these parameters.

As an alternative not illustrated here, the elastic tube can be only attached to a single one of its ends, and/or longitudinally project from the end wall.

FIG. 11 illustrates another embodiment, in which the elastic tube 7 has a variable diameter on at least part of its length.

In this example, the elastic tube is convex between its ends and has a diameter variation d12, symmetrically formed about its median section M7. In the top part of the figure, this variation is made in a rounded shape. In the example in the bottom part of the figure, this variation is made as a symmetrical frustum of a cone, each of a length L.

In other embodiments, the elastic tube has for example a differently distributed variation, for example asymmetrically, end diameters different from each other, a concave shape on all or part of its length, or a combination of these parameters.

In alternatives of these embodiments, the elastic tube 7 is attached by a single one of its ends about a tip and extends from this tip to thus form at its other end, a skirt which surrounds the cable.

FIG. 12 illustrates an alternative applicable to different embodiments using an elastic tube.

In this alternative, the elastic tube 7 has one or more longitudinal slots 8 distributed on its circumference, here six slots distributed at 60°. The choice of the number and geometry of these slots allows more freedom in determining the radial stiffness of the tube and its friction resistance during introduction.

This alternative also illustrates a feature which can be applied to elastic tube embodiments, wherein the tube 7 has a rounded part 30" at its ends between its periphery and its end wall 30', in its connection with the tubular part 30 of the tip 4, also allowing more freedom in determining the radial stiffness of the device.

Figure 13:
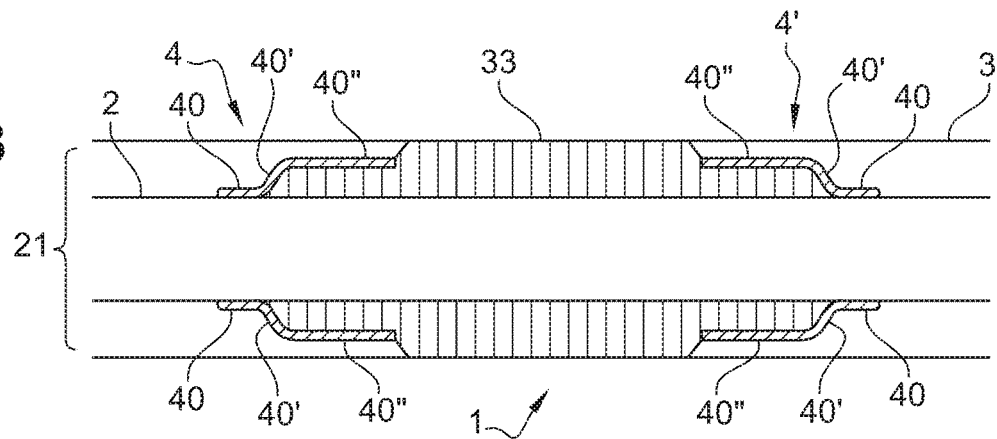
FIG. 13 is a longitudinal cross-section schematic view of a vibration damping device according to one embodiment of the invention using a tubular metal braid.

FIG. 13 illustrates another embodiment including two tips 4 and 4' attached to the cable 2, between which a tube shaped metal braid 33 which surrounds the cable is mounted. This braid has a thickness and a determined structure such that its insertion into the cavity imposes thereto a radial compression comprising an elastic component, thus putting it in abutment against the walls of the cavity. This elastic component, combined with the frictions occurring between the braid fibres, yields, a damping behaviour according to different forms and performances, and makes it possible to meet different constraints.

At each of its ends, this elastic braid 33 is attached to one of the tips 4 and 4'. Each of the tips 4 and 4' includes a first tubular shaped part 40 which has an adjusted internal diameter very slightly higher than the diameter of the cable 2 in order to enable the tips 4 and 4' to be inserted into and assembled to the surface of the cable 2. This first part 40 is extended through a transition part 40', which flares up to a second tubular shaped part 40" and with a greater internal diameter than the external diameter of the cable, while remaining with a smaller external diameter than that of the cavity.

In this example, the elastic braid 33 is attached through both its ends about the external surface of the cable 2 and inside this second part 40", for example by crimping or soldering or brazing.

Figure 2A:
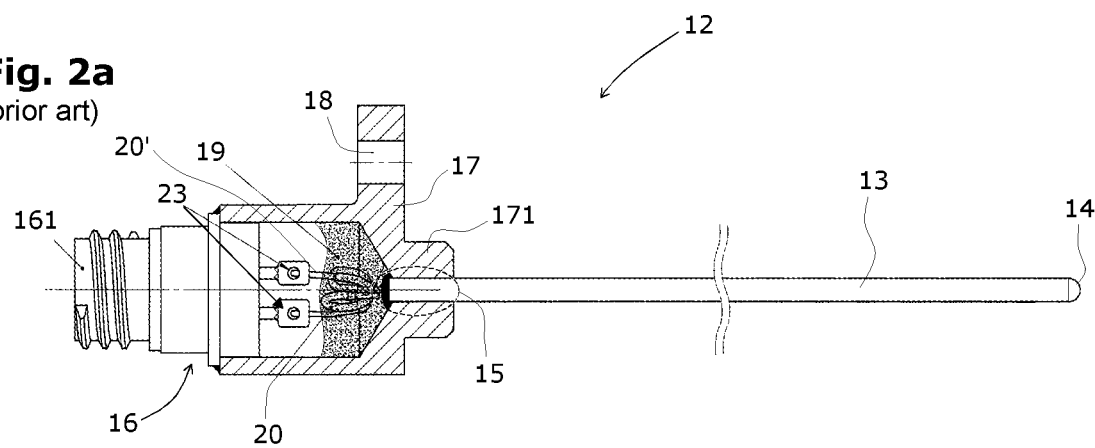
FIG. 2a is a longitudinal cross-section view which illustrates an example of a typical thermocouple type sensor made from a mineral-insulated cable similar to that of FIG. 1 but in a two-conductor version.
Figure 2B:
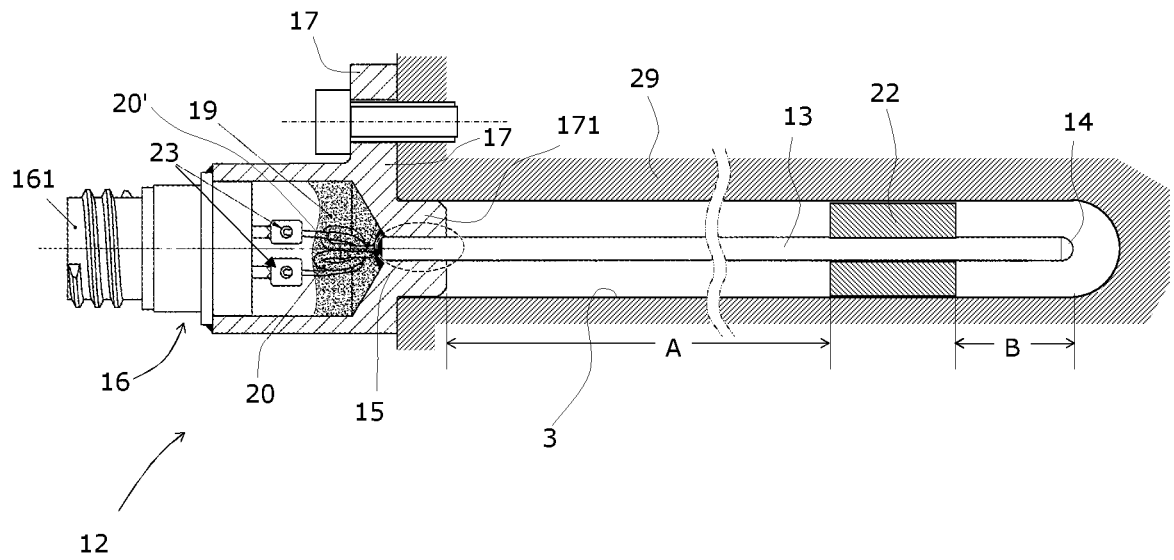
FIG. 2b is a longitudinal cross-section view which illustrates the thermocouple of FIG. 2a further to assembling a rigid tube according to prior art on the surface of the mineral-insulated cable, and once it is integrated into a cavity.
Figure 14:
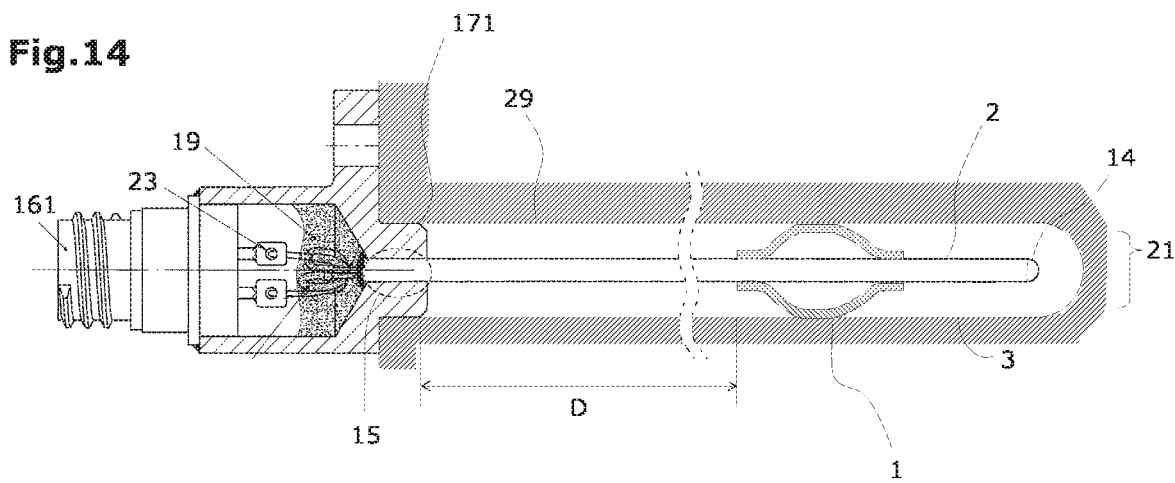
FIG. 14 is a longitudinal cross-section schematic view of the sensor of FIG. 2a, equipped with the damping device of FIG. 5a, 5b or 5c, once it is integrated into the cavity.

By way of example, FIG. 14 illustrates an example of thermocouple type sensor, such as that of FIG. 2a, on which the cable 2 receives a damping device according to the embodiment of FIGS. 5a, or 5b and 5c, for example integrated into the cavity 3 which corresponds to a housing of the gas turbine exhaust.

It is to be noted that the embodiments described herein are similarly or identically applicable in the case of a flexible cable and/or when the cavity corresponds to different housings depending on the technological field in which the cable 2 is used (for example in the field of temperature measurement with thermocouples, the field of heating applications or the field of signal transmission cables or flexible brake hoses).

As can be seen in FIG. 14, and preferably for all the embodiments, the vibration damping device 1 is attached to the cable 2 at a non-zero determined distance D from the attachment part. Preferably, the device 1 does not comprise any part which is attached to the attachment part. In particular, it is only attached to the cable 2 at a distance from the attachment part and from its connection 15 with the cable 2, which connection 15 is herein inside a positioning sleeve 171. Typically, this distance is determined from the parameters of the sensor, such as the cable length, diameter, stiffness, fatigue resistance, and/or vibrations it will have to suffer. It can be for example a few millimetres, at least 1 cm or even at least 3 cm, and for example up to 10 cm or even 20 cm. The structure of this damping device indeed enables it to be attached at any longitudinal location, alone or in a plurality, to the non held part of the cable 2.

By making a damping device which is independent and remote from the attachment part, it is easier to adapt position of the damper to the cable configuration. Upon designing the damper, this also makes it possible to decrease constraints related to the accurate shape of the attachment part, or even to use a same damper for different sensor types. This also makes it possible to limit deterioration risks for this attachment part upon attaching the damping device.

In the above-mentioned embodiments, the tip(s) is (are) for example attached to the surface of the cable 2 through welding, for example laser or TIG or plasma, or by soldering or brazing or crimping.

The damping device is for example partly or fully made of inconel or stainless steel.

Of course, the invention is not limited to the examples just described and many alterations can be provided to these examples without departing from the scope of the invention.

The invention claimed is:

1. A device for damping vibrations suffered by a mineral-insulated cable or by a flexible cable, for being integrated into a cavity having a greater cross-section than the cross-section of the mineral-insulated or flexible cable, wherein said device comprises:
at least two tips having a tubular cross-section, such as on at least 30% of their periphery, with shape that is adapted for each to be fixedly assembled to the surface of the mineral-insulated or flexible cable, and
at least one contact element being a flexible element having an elastic behaviour, extending from each of said tips and connecting them between each other,
and wherein said flexible element is configured such that, when the device is assembled to the surface of the mineral-insulated or flexible cable and the mineral-insulated or flexible cable is integrated into the cavity, the flexible element is abutting on at least one abutment point of the internal wall of the cavity, providing damping of the vibrations suffered by the mineral-insulated or flexible cable.

2. The device according to claim 1, further comprising at least one other contact element, arranged to be assembled to the surface of the mineral-insulated or flexible cable and arranged to contact with the internal wall of the cavity at at least one contact point angularly deviated with respect to the abutment point of at least one flexible element by at least 120° about the axis of the mineral-insulated or flexible cable.

3. The device of claim 1, further comprising at least one tip attached to the cable and wherein the flexible element is made of at least one elastic strip extending from the tips, and deviating from said tip to abut on a point of the internal wall of the cavity.

4. The device of claim 3, wherein both tubular tips (4, 4') each comprise an end, said ends being connected to each other by at least one elastic strip (5; 5') abutting with at least one point of the internal wall of the cavity.

5. The device of claim 4, wherein both tips and the flexible element(s) are formed by a single two-dimensional piece or sheet metal, having longitudinal cut-offs forming one or more elastic strips between two non-cut-off parts, which are shaped to make the tubular tips.

6. The device of claim 4, wherein the at least one elastic strip has, in a so-called central part located between both tips, a convex shape deviating from the cable to abut with at least one point (P) of the internal wall of the cavity (3).

7. The device of claim 6, wherein the at least one elastic strip has, in the central part, a longitudinal profile having;
  a rounded shape, or
  a "Π" or "U"-shape, or
  a "Λ" or "V"-shape.

8. The device of claim 4, wherein the at least one elastic strip has, in the central part, a linear shape along a direction longitudinal to the cable or oriented within 45° from such a longitudinal direction.

9. A mineral-insulated cable or flexible cable including a first so-called free end, for being integrated into a cavity, and a so-called held end which is attached in an attachment part for being attached with respect to this cavity, wherein the mineral-insulated or flexible cable further comprises at least one vibration damping device according to claim 8, said at least one vibration damping device being attached to a part of the mineral-insulated or flexible cable located between the free end and the held end, called a non-held part, at a non-zero determined distance from the attachment part.

10. A method for manufacturing a mineral-insulated or flexible cable, for being integrated into a cavity having a greater cross-section than the cross-section of the mineral-insulated or flexible cable, the method comprising:
  providing a mineral-insulated or flexible cable, including
    a free end for being integrated into a cavity and a so-called held end which is attached in an attachment part for being attached with respect to this cavity;
  providing a damping device according to claim 8 determined to abut with the internal wall of this cavity; and
  assembling and attaching this damping device to the external surface of a part of the mineral-insulated or flexible cable located between the free end and the held end, called non-held part, at a non-zero determined distance from the attachment part.

11. The device of claim 4, wherein both tips and the flexible element(s) are formed by a single two-dimensional piece or sheet metal, having longitudinal cut-offs forming one or more elastic strips between two non-cut-off parts, which are shaped to make the tubular tips,
  and wherein the at least one elastic strip has, in a so-called central part located between both tips, a convex shape deviating from the cable to abut with at least one point of the internal wall of the cavity.

12. The device of claim 11, wherein the at least one elastic strip has, in the central part, a longitudinal profile having;
  a rounded shape, or
  a "Π" or "U"-shape, or
  a "Λ" or "V"-shape;
  and wherein the at least one elastic strip has, in the central part, a linear shape along a direction longitudinal to the cable or oriented within 45° from such a longitudinal direction.

13. The device of claim 1, wherein the flexible element includes an elastic tube attached about the tips, the elastic tube having at least one elasticity along a radial direction and being arranged to abut with at least one cylindrical part of the internal wall of the cavity.

14. The device of claim 13, wherein the elastic tube has a constant diameter on all or most of its contact length with the cavity.

15. The device of claim 14, wherein the elastic tube has one or more longitudinal slots, or oriented within 45° from its longitudinal axis.

16. The device of claim 13, wherein the elastic tube has a variable diameter on at least part of the elastic tube's length, in particular in a widened shape in the central part or in a frustro-conical shape.

17. The device of claim 16, wherein the elastic tube has one or more longitudinal slots, or oriented within 45° from its longitudinal axis.

18. The device of claim 13, wherein the elastic tube has one or more longitudinal slots, or oriented within 45° from a longitudinal axis.

19. The device of claim 1, further comprising at least two tips and wherein the flexible element comprises a braid surrounding the cable and connecting these two tips to each other, said braid being determined in thickness so as to yield an elastic behaviour and bear both against the external wall of the cable and against the internal wall of the cavity.

20. A mineral-insulated cable or flexible cable including a first so-called free end, for being integrated into a cavity, and a so-called held end which is attached in an attachment part for being attached with respect to this cavity, wherein the mineral-insulated or flexible cable further comprises at least one vibration damping device according to claim 19, said at least one vibration damping device being attached to a part of the mineral-insulated or flexible cable located between the free end and the held end, called a non-held part, at a non-zero determined distance from the attachment part.

21. A method for manufacturing a mineral-insulated or flexible cable, for being integrated into a cavity having a greater cross-section than the cross-section of the mineral-insulated or flexible cable, the method comprising:
  providing a mineral-insulated or flexible cable, including
    a free end for being integrated into a cavity and a so-called held end which is attached in an attachment part for being attached with respect to this cavity;
  providing a damping device according to claim 19 determined to abut with the internal wall of this cavity; and
  assembling and attaching this damping device to the external surface of a part of the mineral-insulated or flexible cable located between the free end and the held end, called non-held part, at a non-zero determined distance from the attachment part.

22. A mineral-insulated cable or flexible cable including a first so-called free end, for being integrated into a cavity, and a so-called held end which is attached in an attachment part for being attached with respect to this cavity, wherein the mineral-insulated or flexible cable further comprises at least one vibration damping device according to claim 1, said at least one vibration damping device being attached to a part of the mineral-insulated or flexible cable located between the free end and the held end, called a non-held part, at a non-zero determined distance from the attachment part.

23. A method for manufacturing a mineral-insulated or flexible cable (21), for being integrated into a cavity (3) having a greater cross-section than the cross-section of the mineral-insulated or flexible cable, the method comprising:
   providing a mineral-insulated or flexible cable, including a free end for being integrated into a cavity (3) and a so-called held end which is attached in an attachment part for being attached with respect to this cavity;
   providing a damping device according to claim 1 determined to abut with the internal wall of this cavity; and
   assembling and attaching this damping device to the external surface of a part of the mineral-insulated or flexible cable located between the free end and the held end, called non-held part, at a non-zero determined distance from the attachment part.

* * * * *